(12) United States Patent
Matsuda

(10) Patent No.: US 9,616,755 B2
(45) Date of Patent: Apr. 11, 2017

(54) REGENERATIVE BRAKE CONTROL SYSTEM OF ELECTRIC VEHICLE

(71) Applicant: KAWASAKI JUKOGYO KABUSHIKI KAISHA, Kobe-shi, Hyogo (JP)

(72) Inventor: Yoshimoto Matsuda, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 0 days.

(21) Appl. No.: 14/437,448

(22) PCT Filed: Oct. 22, 2012

(86) PCT No.: PCT/JP2012/006748
§ 371 (c)(1),
(2) Date: Apr. 21, 2015

(87) PCT Pub. No.: WO2014/064729
PCT Pub. Date: May 1, 2014

(65) Prior Publication Data
US 2015/0274020 A1    Oct. 1, 2015

(51) Int. Cl.
*B60L 7/18* (2006.01)
*B60T 8/32* (2006.01)
(Continued)

(52) U.S. Cl.
CPC    *B60L 7/18* (2013.01); *B60L 7/14* (2013.01); *B60L 7/26* (2013.01); *B60L 11/1803* (2013.01);
(Continued)

(58) Field of Classification Search
CPC ...... B60L 7/18; B60L 7/14; B60L 7/26; B60L 11/1803; B60L 11/1877; B60L 15/2009;
(Continued)

(56) References Cited

U.S. PATENT DOCUMENTS 4,215,304 A * 7/1980 D'Atre ............... H02P 23/07
                                                    318/758
5,615,933 A * 4/1997 Kidston ............... B60L 3/102
                                                    180/65.1
(Continued)

FOREIGN PATENT DOCUMENTS

JP    H02036701 A    2/1990
JP    H08079907 A    3/1996
(Continued)

OTHER PUBLICATIONS

Translation of Inagaki(JP 2002101693 which was provided in IDS).*
(Continued)

*Primary Examiner* — Abby Lin
(74) *Attorney, Agent, or Firm* — Alleman Hall McCoy Russell & Tuttle LLP

(57) ABSTRACT

A regenerative brake control system of an electric motorcycle comprises an electric motor, sensors for detecting vehicle states of the electric motorcycle, and a control unit which sets target regenerative torque based on the vehicle states, when a regeneration condition is satisfied, and performs asymptotic control in such a manner that a torque command provided to the electric motor gets gradually close to the target regenerative torque with a passage of time.

13 Claims, 6 Drawing Sheets

(51) Int. Cl.
*B62M 7/04* (2006.01)
*B60L 15/20* (2006.01)
*B60L 7/26* (2006.01)
*B60L 11/18* (2006.01)
*B60L 7/14* (2006.01)
*B62J 99/00* (2009.01)

(52) U.S. Cl.
CPC ....... *B60L 11/1877* (2013.01); *B60L 15/2009* (2013.01); *B60T 8/32* (2013.01); *B62M 7/04* (2013.01); *B60L 2200/12* (2013.01); *B60L 2210/10* (2013.01); *B60L 2240/12* (2013.01); *B60L 2240/421* (2013.01); *B60L 2240/423* (2013.01); *B60L 2250/16* (2013.01); *B60L 2250/24* (2013.01); *B60L 2250/26* (2013.01); *B60L 2270/145* (2013.01); *B62J 2099/0026* (2013.01); *B62K 2204/00* (2013.01); *B62K 2207/00* (2013.01); *B62K 2208/00* (2013.01); *Y02T 10/645* (2013.01); *Y02T 10/7005* (2013.01); *Y02T 10/705* (2013.01); *Y02T 10/7216* (2013.01); *Y02T 10/7275* (2013.01)

(58) Field of Classification Search
CPC ............. B60L 2200/12; B60L 2210/10; B60L 2250/16; B60L 2250/24; B60L 2250/20; B60L 2270/145; B60T 8/32; B62M 7/04; B62K 2204/00; B62K 2208/00; B62K 2207/00; Y02T 10/645; Y02T 10/7005; Y02T 10/705; Y02T 10/7216; Y02T 10/7275

See application file for complete search history.

(56) References Cited

U.S. PATENT DOCUMENTS

| | | | | |
|---|---|---|---|---|
| 5,775,784 A | * | 7/1998 | Koga | ................... B60L 3/0023 |
| | | | | 303/122 |
| 2012/0080249 A1 | * | 4/2012 | Yates, III | ................. B60L 7/18 |
| | | | | 180/65.31 |
| 2012/0101705 A1 | * | 4/2012 | Templin | ................ B60W 30/20 |
| | | | | 701/99 |
| 2012/0277944 A1 | * | 11/2012 | Kaneko | .................. B60K 6/442 |
| | | | | 701/22 |
| 2013/0253742 A1 | | 9/2013 | Sawayama et al. | |
| 2013/0282219 A1 | | 10/2013 | Matsuda | |

FOREIGN PATENT DOCUMENTS

| | | |
|---|---|---|
| JP | H10201008 A | 7/1998 |
| JP | 2002101693 A | 4/2002 |
| JP | 2005143274 A | 6/2005 |
| JP | 2011045184 A | 3/2011 |
| JP | 2012166682 A | 9/2012 |
| WO | 9616831 A1 | 6/1996 |
| WO | 2012053592 A1 | 4/2012 |
| WO | 2012090253 A1 | 7/2012 |

OTHER PUBLICATIONS

Translation of Kawamura(JP 08079907 which was provided in IDS).*
ISA Japanese Patent Office, International Search Report Issued in Application No. PCT/JP2012/006748, Nov. 20, 2012, WIPO, 4 pages.

* cited by examiner

REGENERATIVE BRAKE CONTROL SYSTEM OF ELECTRIC VEHICLE

TECHNICAL FIELD

The present invention relates to a regenerative brake control system of an electric vehicle in which an electric motor activates a drive wheel and generates regenerative torque to apply a brake to the drive wheel.

BACKGROUND ART

In an electric vehicle which activates a drive wheel by an electric motor, there is a known regenerative system in which the electric motor generates electric power with the rotational force of the drive wheel and supplies electric power to a battery or the like to convert kinetic energy into electric energy. In this regenerative system, a regenerative braking force is applied to the drive wheel with electric power generated in the electric motor, and a braking force which is different from a mechanical braking force generated in a brake mechanism can be applied to the drive wheel. For example, Patent Literature 1 discloses a driving control system as an example of a regenerative system.

In the driving control system disclosed in Patent Literature 1, the electric motor generates electric power corresponding to the rotational force of the drive wheel. Therefore, a regeneration command is provided to the electric motor, upon the operation of an acceleration operation member, such as an accelerator grip, being ceased.

CITATION LIST

Patent Literature

Patent Literature 1: Japanese Laid-Open Patent Application Publication No. 2005-143274

SUMMARY OF INVENTION

Technical Problem

However, since inertia is smaller in an electric vehicle than in a vehicle that is driven by an internal combustion engine, when a regeneration command is received and a braking force is applied, the impacts that are associated with the braking force tend to be more severe. Vehicles having a relatively light weight, especially motorcycles, are significantly affected by a regeneration impact generated just after the regeneration command is provided.

Accordingly, an object of the present invention is to provide a regenerative brake control system of an electric vehicle which can drive smoothly while performing regenerative braking.

Solution to Problem

To achieve the above described object, according to an aspect of the present invention, there is provided a regenerative brake control system comprising: an electric motor; a detecting device for detecting a vehicle state; and a control unit which sets a regenerative torque of the electric motor; wherein the control unit sets a target regenerative torque based on the vehicle state detected by the detecting device when a predetermined regeneration condition is satisfied, and performs asymptotic control in such a manner that a regenerative torque command provided to the electric motor gets gradually close to the target regenerative torque with a passage of time.

In this configuration, the torque command is made gradually close to the target regenerative torque with a passage of time, after the predetermined regeneration condition is satisfied. This can lessen a change in a motor rotational speed and hence mitigate an impact generated by the braking, as compared to a case where the torque command which is equal to the target regenerative torque is provided just after the regeneration condition is satisfied.

The regenerative brake control system may further comprise an acceleration operation member which is operated to set output torque or an acceleration rate of a vehicle; and a speed sensor for detecting a driving speed or a motor rotational speed, wherein the control unit may determine that the regeneration condition is satisfied, when an operation amount of the acceleration operation member is less than a predetermined value and the driving speed or the motor rotational speed is equal to or higher than a predetermined regeneration initiation speed.

In this configuration, a deceleration request made by a rider can be determined from the operation amount of the acceleration operation member. Also, regenerative braking is not performed, when the driving speed or the motor rotational speed is lower than the predetermined regeneration initiation speed. This makes it possible to prevent a situation in which the vehicle speed becomes very slow and driving becomes unstable, or the vehicle body drives backward undesirably, due to regenerative braking. In the regenerative brake control system, when the regeneration condition is satisfied, the control unit performs the asymptotic control in such a manner that a value of the regenerative torque command provided to the electric motor is decreased with a passage of time, from a positive torque value which is smaller than a positive torque value which is just before the regeneration condition is satisfied, toward a negative torque value of the target regenerative torque.

In this configuration, in the asymptotic control, the positive torque generated in the electric motor just after the regeneration condition is satisfied can be gradually decreased and made close to the target regenerative torque corresponding to the negative torque. The asymptotic control performed in this way can further mitigate an impact, as compared to a case where the torque command is made closer from a state in which the torque is zero to the target regenerative torque.

The control unit may perform the asymptotic control when a difference between a value of torque output from the electric motor and a value of the target regenerative torque is larger than a predetermined value, and the control unit may provide a target regenerative torque command immediately when the difference between the value of the torque output from the electric motor and the value of the target regenerative torque is smaller than the predetermined value. In this configuration, an impact generated due to regenerative braking can be mitigated when the difference between the value of the torque output from the electric motor and the value of the target regenerative torque is larger than the predetermined value, in which case it is necessary to mitigate the impact. On the other hand, when the difference between the command value and the value of the target regenerative torque is smaller than the predetermined value, the target regenerative torque command is provided. Thereby, shifting to the target regenerative torque can be made sooner while preventing an increase in the impact.

The control unit may perform the asymptotic control when the driving speed or the motor rotational speed is equal to or higher than a specified speed which is higher than a regeneration initiation speed, and the control unit may provide a target regenerative torque command immediately when the driving speed or the motor rotational speed is lower than the specified speed.

In this configuration, an impact generated due to regenerative braking can be mitigated when the driving speed or the motor rotational speed is equal to or higher than the specified speed, in which case it is necessary to mitigate the impact. On the other hand, when the driving speed or the motor rotational speed is lower than the high speed, the target regenerative torque command is provided. Thus, shifting to the target regenerative torque can be made sooner while preventing an increase in the impact. The above control unit may perform the asymptotic control when a change in the operation amount of the acceleration operation member which occurs with time before the regeneration condition is satisfied is equal to or larger than a predetermined value, and provide a target regenerative torque command immediately when the change in the operation amount of the acceleration operation member which occurs with time before the regeneration condition is satisfied is smaller than the predetermined value.

In this configuration, an impact generated due to regenerative braking can be mitigated when the change in the operation amount of the acceleration operation member which occurs with time before the regeneration condition is satisfied is larger, in which case it is necessary to mitigate the impact. On the other hand, when the change in the operation amount of the acceleration operation member which occurs with time before the regeneration condition is satisfied is smaller, the target regenerative torque command is provided. Thus, shifting to the target regenerative torque can be made sooner while preventing an increase in the impact. The above regenerative brake control system may be configured to transmit a driving power generated in the electric motor via a transmission, and the regenerative brake control system may further comprise a transmission detecting device for detecting a change gear ratio of the transmission, and set an asymptotic control amount based on the change gear ratio in the asymptotic control.

In this configuration, a difference can be made to the degree of the mitigation of a regeneration impact based on the change gear ratio. For example, when the change gear ratio is lower, the regeneration impact is affected more, and therefore, the asymptotic control amount is set larger, while when the change gear ratio is higher, the asymptotic control amount is set smaller.

In the above regenerative brake control system, the vehicle is preferably a two-wheeled vehicle (motorcycle). A two-wheeled vehicle is designed to have a lighter weight than a four-wheeled vehicle. Therefore, a two-wheeled vehicle has a smaller inertia and is affected more by the impact generated by regenerative braking, than a four-wheeled vehicle. Therefore, the regenerative brake control system is more effectively applied to a two-wheeled vehicle.

Advantageous Effects of Invention

In accordance with the present invention, it becomes possible to provide a regenerative brake control system of an electric vehicle which can drive smoothly while performing regenerative braking.

DESCRIPTION OF EMBODIMENTS

Hereinafter, the embodiment of the present invention will be described with reference to the accompanying drawings. Hereinafter, the stated directions are referenced from the perspective of a rider riding on an electric motorcycle 1 which is the embodiment of an electric vehicle of the present invention. Throughout the drawings, the same or corresponding components are identified by the same reference symbols and will not be described repeatedly, except otherwise noted.

Figure 1:
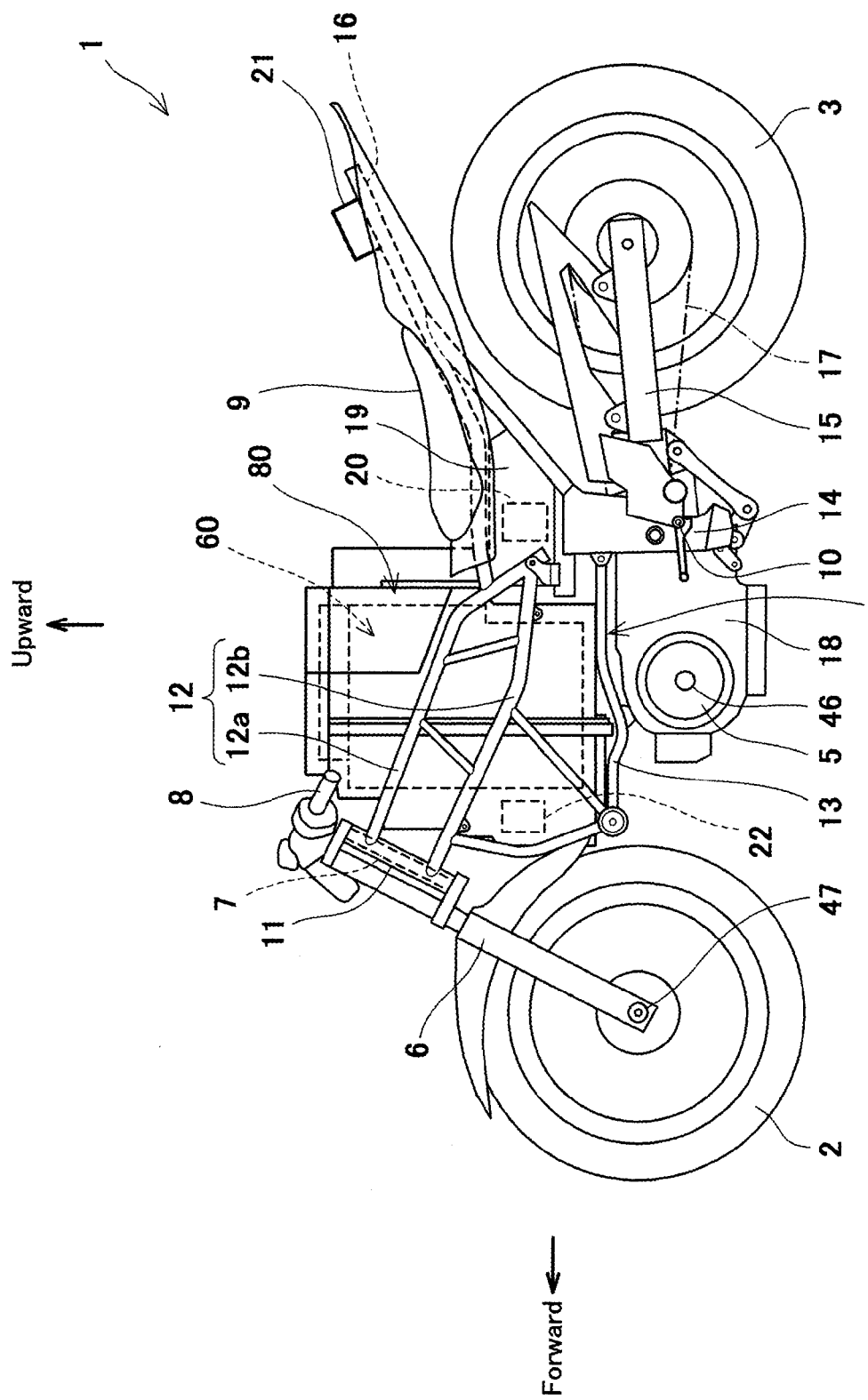
FIG. 1 is a left side view of an electric motorcycle including a regenerative brake control system according to an embodiment of the present invention.

FIG. 1 is a left side view of the electric motorcycle 1. As shown in FIG. 1, the electric motorcycle 1 includes a front wheel 2 which is a driven wheel, a rear wheel 3 which is a drive wheel, a vehicle body frame 4 placed between the front wheel 2 and the rear wheel 3, and an electric motor 5 as a driving power source for the electric motorcycle 1. The electric motorcycle 1 of the present embodiment does not include an internal combustion engine, and is able to drive on a road by rotating the rear wheel 3 with a driving power generated in the electric motor 5.

The front wheel 2 is rotatably mounted to the lower end portion of a front fork 6. The front fork 6 is coupled to a bar-type handle 8 via a steering shaft 7. In the present embodiment, a vehicle speed sensor 47 is attached to the front wheel 2 at the lower end portion of the front fork 6. The steering shaft 7 is rotatably supported on a head pipe 11. The head pipe 11 is provided with a main frame 12.

A pivot frame 14 is mounted to the rear lower end portion of the main frame 12. The pivot frame 14 is provided with a swing arm 15. The swing arm 15 is pivotally joined at its front end portion to the pivot frame 14. The rear wheel 3 is rotatably mounted to the rear end portion of the swing arm 15. A seat rail 16 is provided on the rear end portion of the main frame 12. A rider straddle seat 9 is mounted onto the seat rail 16.

The electric motorcycle 1 is a straddle-type vehicle. The rider straddles the seat 9 and is seated thereon. The rider straddling the seat 9 and facing forward can grip the handle 8 with stretched hands. The rider straddling the seat 9 puts the rider's left leg on a left foot step 10 in a location which is leftward relative to the left part of the pivot frame 14, and puts the rider's right leg on a right foot step 10 in a location which is rightward relative to the right part of the pivot frame 14. Since the rider straddles a vehicle body in this way, the straddle-type vehicle has a small width in at least a region in the vicinity of the seat 9. In particular, the motorcycle makes a turn in a state in which a centripetal force generated by banking the vehicle body is balanced with a centrifugal force. The entire vehicle width of the motorcycle is small, because the motorcycle is straddled by the rider. It will be understood that the two-wheeled vehicle is designed to have a lighter weight than a four-wheeled vehicle. Also, the two-wheeled vehicle has a smaller inertia and is affected more by the impact generated by regenerative braking than a four-wheeled vehicle.

The electric motorcycle 1 includes a motor case 18, an inverter case 19, and a battery case 80. The motor case 18 accommodates an electric motor 5. The inverter case 19 accommodates electric components including an inverter unit 20. The battery case 80 accommodates electric components including a high-voltage battery unit 60 (hereinafter simply referred to as battery unit 60) for storing electric power supplied to the electric motor 5. The battery unit 60 is able to store DC power. The inverter unit 20 converts the DC power stored in the battery unit 60 into AC power.

The electric motor 5 operates with the AC power supplied from the inverter unit 20 to the electric motor 5 to generate a driving power for moving the vehicle body. The electric motor 5 is, for example, an AC motor. As the AC motor, there are a brushless DC motor, a synchronous electric motor, an inductive electric motor, for example. The driving power generated in the electric motor 5 is transmitted to the rear wheel 3 via a driving power transmission mechanism 17. The electric motor 5 is configured to generate the electric power with a rotational force transmitted from the rear wheel 3 to the electric motor 5 via the driving power transmission mechanism 17, during deceleration.

The driving power transmission mechanism 17 includes a transmission (not shown, here). The transmission is accommodated together with the electric motor 5 in the motor case 18. The driving power transmission mechanism 17 is, for example, a chain, a belt, or a drive shaft. During acceleration, the driving power transmission mechanism 17 transmits output torque of the electric motor 5 to the rear wheel 3 as the drive wheel, while during deceleration, the driving power transmission mechanism 17 transmits the rotational force of the rear wheel 3 to the electric motor 5.

Next, the configuration of a regenerative brake control system 100 included in the electric motorcycle 1 will be specifically described with reference to FIG. 2.

Figure 2:
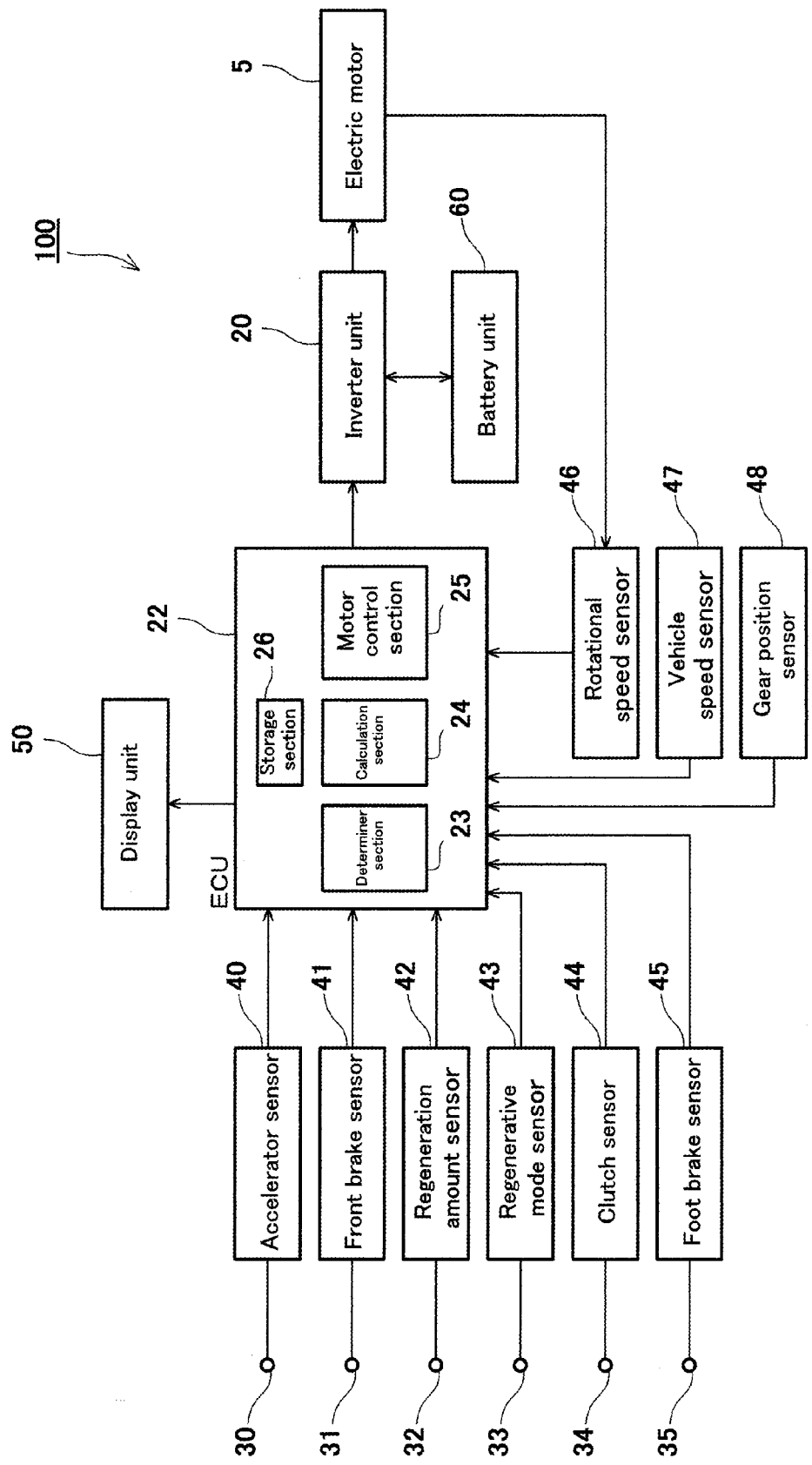
FIG. 2 is a block diagram showing the configuration of the regenerative brake control system according to the embodiment of the present invention.

As shown in FIG. 2, the regenerative brake control system 100 includes the electric motor 5 as a driving power source, the battery unit 60 as an electric power supply unit for the electric motor 5, the inverter unit 20, a control unit 22 for controlling the electric motorcycle 1, operation members 30 to 35 placed in proper locations of the electric motorcycle 1, sensors 40 to 47 for detecting vehicle states, and a display unit 50 for displaying a speed, for example. In FIG. 2, only the battery unit 60 as the electric power supply unit for the electric motor 5 is shown, and the control unit 22 and the other electric components are not shown.

The electric motor 5 is connected to the battery unit 60 via the inverter unit 20. The electric motor 5 performs power running as an electric motor during acceleration/driving of the electric motorcycle 1 and performs regenerative running as an electric generator during deceleration of the electric motorcycle 1. During the power running, the electric motor 5 operates with the AC power supplied from the inverter unit 20 to the electric motor 5 to generate the driving power for moving the vehicle body. During the power running, the electric motor 5 outputs driving torque as a driving force to the drive wheel through an output shaft thereof. During the regenerative running, the electric motor 5 generates the electric power with the rotational force transmitted from the rear wheel 3 to the electric motor 5. The electric power generated in the electric motor 5 is charged into the battery unit 60 via the inverter unit 20. During the regenerative running, the electric motor 5 generates regenerative torque as a braking force applied to the rear wheel 3 through the output shaft.

The battery unit 60 is connected to the inverter unit 20 and configured to be charged and discharged via the inverter unit 20. During the power running of the electric motor 5, the battery unit 60 is discharged, while during the regenerative running of the electric motor 5, the battery unit 60 is charged.

The control unit 22 includes a determiner section 23 configured to receive information input by the operation members 30 to 35 provided in the locations of the electric motorcycle 1, and other information indicating the vehicle states, from the sensors 40 to 47, and to determine whether or not a regeneration condition is satisfied based on the received information. In the present embodiment, the regeneration condition is defined as conditions relating to the vehicle states, which are used to determine whether or not to shift the electric motor 5 to the regenerative running.

The control unit 22 includes a calculation section 24 configured to perform a target torque calculating process as will be described later, based on the information indicating the vehicle states which are detected by the sensors 40 to 47, according to a result of the determination performed by the determiner section 23. The target torque is defined as a target value of the output torque to be generated in the electric motor 5. In a case where the target torque is a positive value, this means that the control unit 22 provides a command to the inverter unit 20 and shifts the electric motor 5 to power running to allow the electric motor 5 to generate driving torque which is equal to the target driving torque. On the other hand, in a case where the target torque is a negative value, this means that the control unit 22 provides a command to the inverter unit 20 and shifts the electric motor 5 to the regenerative running to allow the electric motor 5 to generate regenerative torque which is equal to the target regenerative torque. In the present embodiment, the calculation section 24 decides the torque command based on the detected value of an accelerator operation amount and the detected value of a motor rotational speed. Then, the calculation section 24 provides the decided target torque to a motor control section 25.

The control unit 22 includes the motor control section 25 configured to activate the electric motor 5 such that its speed is changeable, by using the inverter unit 20 as a power converter, and to control the instantaneous torque of the electric motor 5 during activation. The electric motor 5 is activated such that its speed is changeable by using the power converter in a well-known manner, which will not be described herein. In this case, the control unit 22 performs asymptotic control in such a manner that it provides to the electric motor 5 via the inverter unit 20 a control signal (torque command) which is modified to gradually approach the target torque with a passage of time after the regeneration condition is satisfied, thereby making the output torque of the electric motor 5 gradually closer to the target torque with a passage of time after the regeneration condition is satisfied.

The control unit 22 includes a storage section 26 configured to store data such as the reference torque, programs, information indicating the vehicle states detected by the sensors, for example. Alternatively, the storage section 26 may contain a torque map indicating the detected value of the accelerator operation amount and the value of the target torque defined by the detected value of the motor rotational speed.

The control unit 22 is configured as a processor constituting a microcontroller or the like, and operation programs. The processor executes specified operation programs to perform the corresponding processing, thereby performing functions. The storage section 26 may be implemented by a memory of the microcontroller, or other external memory.

Hereinafter, the configuration of the operation members 30 to 35 and the configuration of the sensors 40 to 47, in the electric motorcycle 1, will be described with reference to FIG. 3, as well as FIG. 2.

Figure 3:
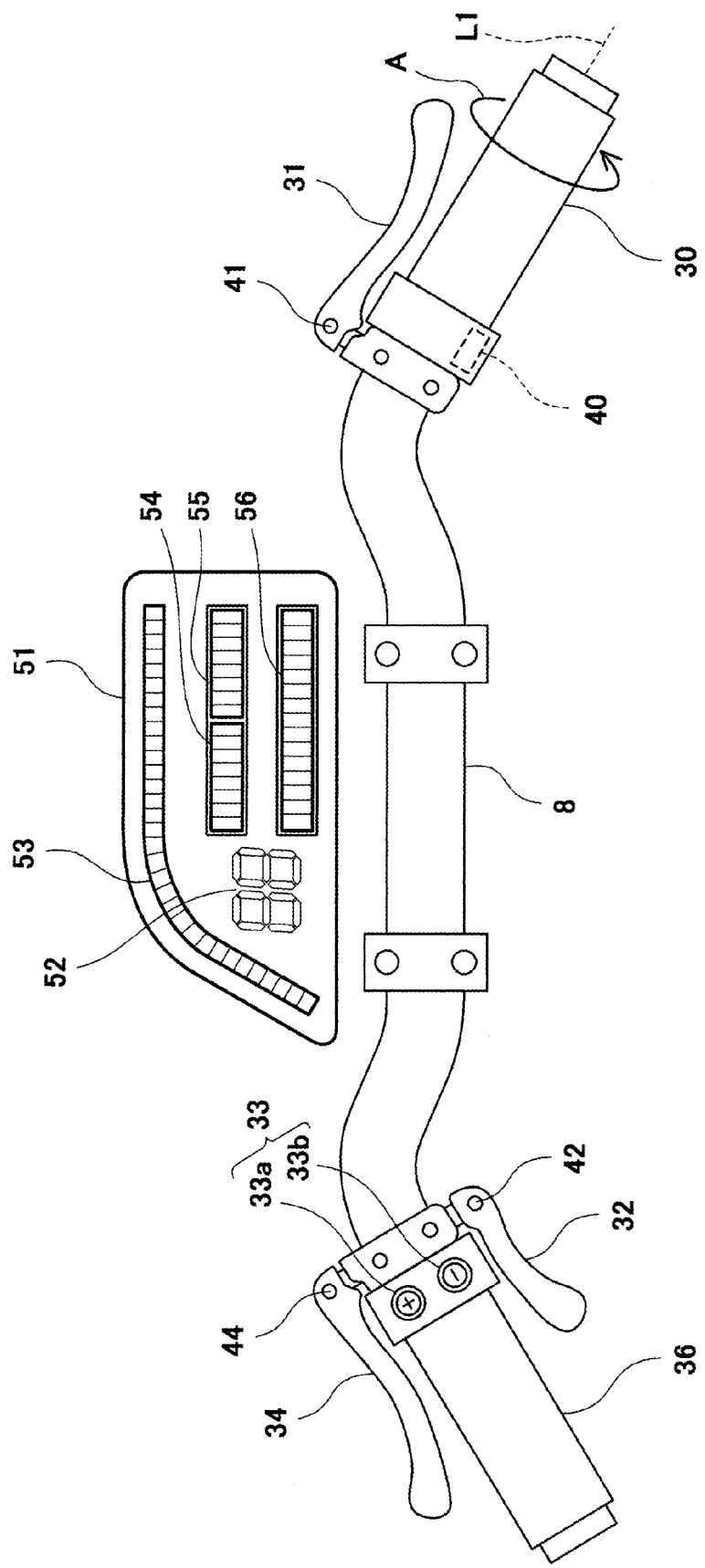
FIG. 3 is an enlarged plan view of a region in the vicinity of a handle of the electric motorcycle of FIG. 1.

As shown in FIG. 3, the handle 8 as a steering device includes a pair of right and left grips 30, 36. As shown in FIG. 3, the pair of right and left grips 30, 36 which are gripping members are provided at the right end portion and the left end portion of the handle 8, respectively. The right grip 30 is an accelerator grip for inputting an acceleration command (more specifically, torque command for the power running) for rotating the rear wheel 3 in an accelerative manner. The accelerator grip 30 which is an acceleration operation member is rotatable around an axis L1 along which the handle 8 extends, and is placed in a predetermined reference position in a state in which the accelerator grip 30 is not operated by the rider. The accelerator grip 30 is applied with a biasing force for biasing the accelerator grip 30 in a predetermined direction (specifically, direction which is opposite to an arrow A and away from the rider, i.e., forward), toward a reference position, and is rotatable in a direction (specifically, direction of the arrow A which is closer to the rider, i.e., rearward) which is opposite to the predetermined direction, against the biasing force.

The accelerator grip 30 is attached with an accelerator grip sensor 40. The accelerator grip sensor 40 provides to the control unit 22 an acceleration command corresponding to an angular displacement amount (hereinafter will be simply referred to as "accelerator operation amount") θ from the reference position of the grip. The motor control section 25 of the control unit 22 adjusts the output torque of the electric motor 5 via the inverter unit 20, in response to this acceleration command.

A brake lever 31 is placed in front of the accelerator grip 30.

The brake lever 31 is an operation member which is operated to activate a front wheel brake mechanism (not shown) provided for the front wheel 2. When the rider pulls the brake lever 31 toward the rider (in a direction which is closer to the rider), the front wheel brake mechanism is activated to apply a mechanical braking force to the front wheel 2. By adjusting the displacement amount of the brake lever 31, the braking force applied to the front wheel 2 can be adjusted. The brake lever 31 is attached with a brake sensor 41. The brake sensor 41 detects whether or not the brake lever 31 has been operated, and sends a detected signal to the control unit 22.

In the present embodiment, a regeneration adjustment lever 32 is provided behind the left grip 36 of the handle 8. The regeneration adjustment lever 32 serves as a first operation member for adjusting the regenerative torque generated in the electric motor 5 during the regenerative running. The regeneration adjustment lever 32 can be gripped together with the left grip 36 with the rider's left thumb put on the regeneration adjustment lever 32. When the rider pushes the regeneration adjustment lever 32 with the rider's left thumb in a direction away from the rider, the regeneration adjustment lever 32 is pivotable to be away from a predetermined reference position. The regeneration adjustment lever 32 is applied with a biasing force for returning the regeneration adjustment lever 32 to the reference position. When the rider releases the regeneration adjustment lever 32 in a state in which the rider pushes the regeneration adjustment lever 32 with the rider's left thumb in the direction away from the rider, the regeneration adjustment lever 32 returns to the reference position.

The regeneration adjustment lever 32 is attached with a regeneration amount sensor 42 for detecting the operation amount of the regeneration adjustment lever 32. The regeneration amount sensor 42 is a position sensor which outputs the adjustment command of the regenerative torque according to a position (i.e., operation amount) with respect to the predetermined reference position. The regeneration amount sensor 42 is connected to the control unit 22 and sends the adjustment command of the regenerative torque to the control unit 22. The control unit 22 adjusts the regenerative braking force of the electric motor 5 during the regenerative running, in response to the received adjustment command of the regenerative torque. In the present embodiment, the adjustment command of the regenerative torque is set so that the regenerative toque increases as the operation amount of the regeneration adjustment lever 32 increases. In this way, the regenerative toque can be adjusted to be increased.

Further, in the present embodiment, the left grip 36 of the handle 8 is attached with a regenerative mode switch 33. The regenerative mode switch 33 serves as a second operation member which is operated to adjust the regenerative toque generated in the electric motor 5 during the regenerative running. In the present embodiment, the regenerative mode switch 33 selects one from among a plurality of adjusted regeneration amounts. Hereinafter, the adjusted regeneration amount selected by the regenerative mode switch 33 will be referred to as a regenerative mode. The regenerative mode switch 33 includes two input buttons which are an upshifting button 33*a* and a downshifting button 33*b*. When the rider pushes either the upshifting button 33*a* or the downshifting button 33*b* with the rider' left thumb while gripping the left grip 36, a desired regenerative mode can be selected. Or, in a case where the rider does not select a desired regenerative mode by using the regenerative mode switch 33, a preset normal regenerative mode is automatically selected.

The regenerative mode switch 33 is attached with a regenerative mode sensor 43 for detecting a command input by the regenerative mode switch 33. The regenerative mode sensor 43 is a switching sensor. In this example, the regenerative mode sensor 43 detects whether or not either one of the two input buttons which are the upshifting button 33*a* and the downshifting button 33*b* has been operated. The regenerative mode sensor 43 is connected to the control unit 22 and sends a detected signal to the control unit 22. The regenerative mode switch 33 for selecting the regenerative mode may be attached to the display unit 50 which displays the values of meters and the like.

As shown in FIGS. 2 and 3, the electric motorcycle 1 includes a clutch lever 34. The clutch lever 34 is placed in front of the left grip 36.

In the present embodiment, the clutch lever 34 serves as an operation member which performs switching between a driving power cut-off state and a driving power transmitted state. The clutch lever 34 so configured is attached with a clutch sensor 44. The clutch sensor 44 is a switching sensor and detects whether or not the clutch lever 34 has been operated. The clutch sensor 44 is connected to the control unit 22, and sends a detected signal to the control unit 22.

As shown in FIG. 2, the electric motorcycle 1 includes a foot brake lever 35. The foot brake lever 35 is an operation member which is operated to activate a rear wheel brake mechanism (not shown) provided for the rear wheel 3. When the rider presses down the tip end portion of the foot brake lever 35, the rear wheel brake mechanism is activated to apply a mechanical braking force to the rear wheel 3. By adjusting the displacement amount of the foot brake lever 35, the mechanical braking force applied to the rear wheel 3 can be adjusted. The foot brake lever 35 so configured is attached with a foot brake sensor 45. The foot brake sensor 45 is a switching sensor and detects whether or not the foot brake lever 35 has been operated. The foot brake sensor 45 sends a detected signal to the control unit 22.

As shown in FIG. 2, the electric motorcycle 1 includes a motor rotational speed sensor 46 and a vehicle speed sensor 47, as the sensors for detecting the other vehicle states. The motor rotational speed sensor 46 detects the rotational speed of the electric motor 5, while the vehicle speed sensor 47 detects the speed of the electric motorcycle 1. The motor rotational speed sensor 46 and the vehicle speed sensor 47 are connected to the control unit 22, and send the detected signals to the control unit 22.

As shown in FIGS. 2 and 3, the electric motorcycle 1 includes the display unit 50 for displaying the speed, and others. The display unit 50 displays the vehicle states based on the information sent from the control unit 22 to the display unit 50. As shown in FIG. 3, a display panel 51 of the display unit 50 is implemented by an instrument panel and placed in front of the handle bar 8 at the center in a vehicle width direction. The display panel 51 includes a speed display section 52 which displays the speed per hour in a digital format, a motor rotational speed display section 53 which displays the rotational speed of the electric motor 5, a regenerative torque display section 54 which displays the regenerative torque, an accelerative torque display section 55, and a SOC (state of charge) display section 56 which displays the SOC of the battery. In addition to these, a driving mode, a gear ratio, a driving distance, a time, for example, may be displayed on the display panel 51.

The handle 8 is attached with a main switch (not shown) which provides a command for starting to supply the electric power to the major electric components of the electric motorcycle 1 or ceasing to supply the electric power to the major electric components. The main switch is also configured to activate the regenerative brake control system 100. The main switch may be, for example, a push button switch, a rotatable switch which is inserted and rotated, such as a key cylinder, or a switch configured to provide a start command by holding, over the switch, an IC card or a portable terminal which enables wireless communication.

Figure 4:
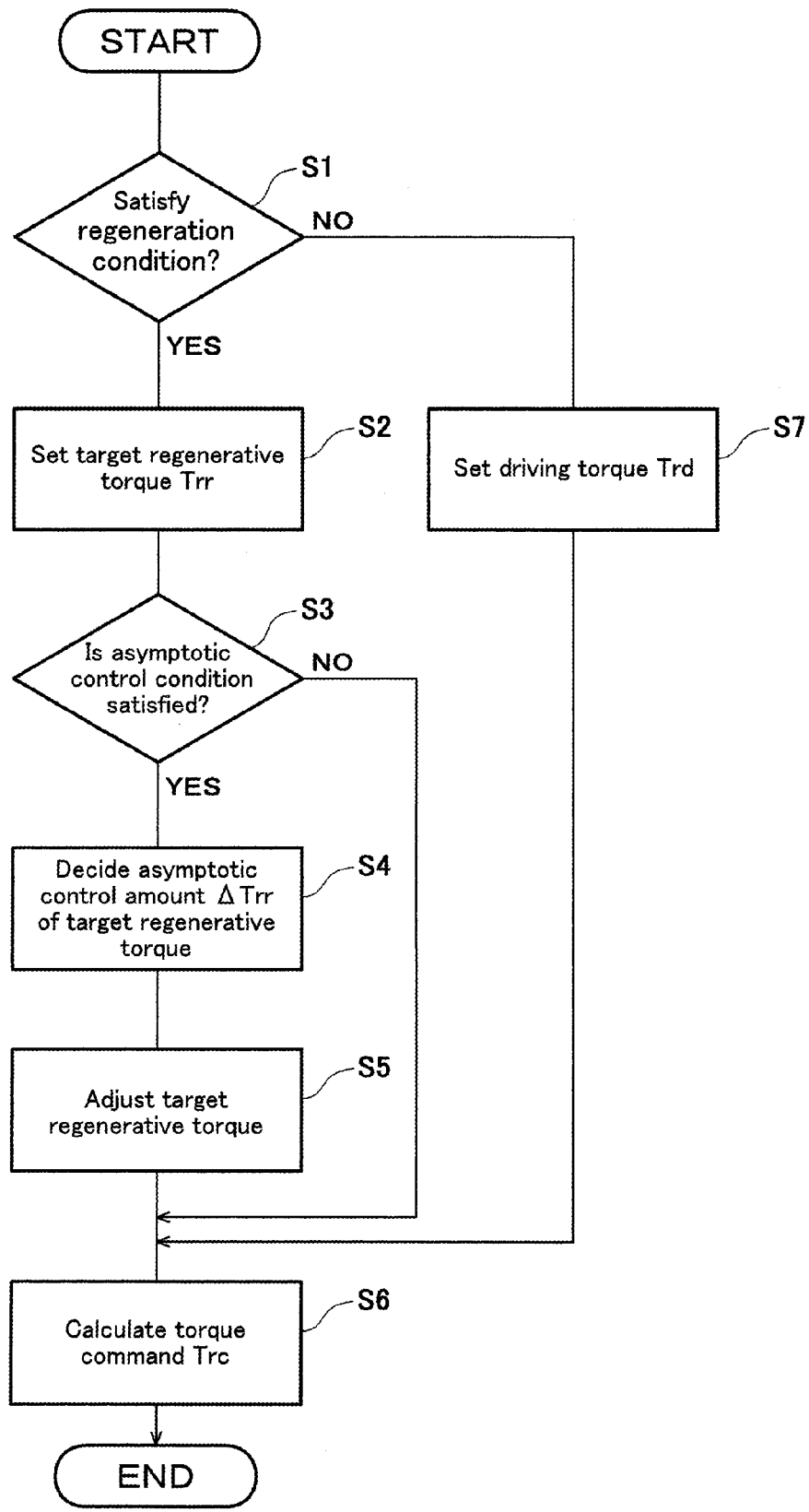
FIG. 4 is a flowchart showing a target torque calculating process performed by the regenerative brake control system of FIG. 2.

The target torque calculating process performed by the control unit 22 in the regenerative brake control system 100 configured above will be described with reference to the flowchart of FIG. 4, and the graphs of FIGS. 5A to 5C.

Figure 5A:
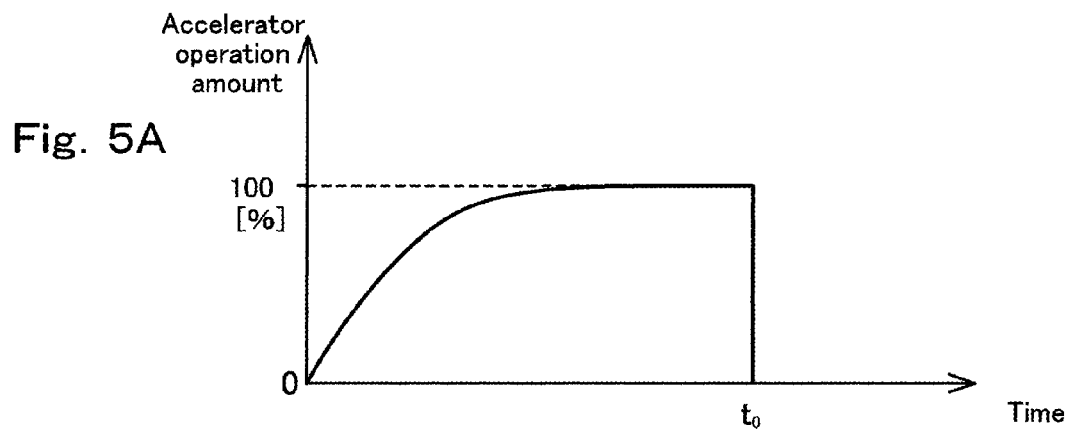
FIGS. 5A to 5C are graphs showing an example of a change in an accelerator operation amount, a change in torque, and a change in a vehicle speed, which occur with a passage of time, in the target torque calculating process of FIG. 4.
Figure 5B:
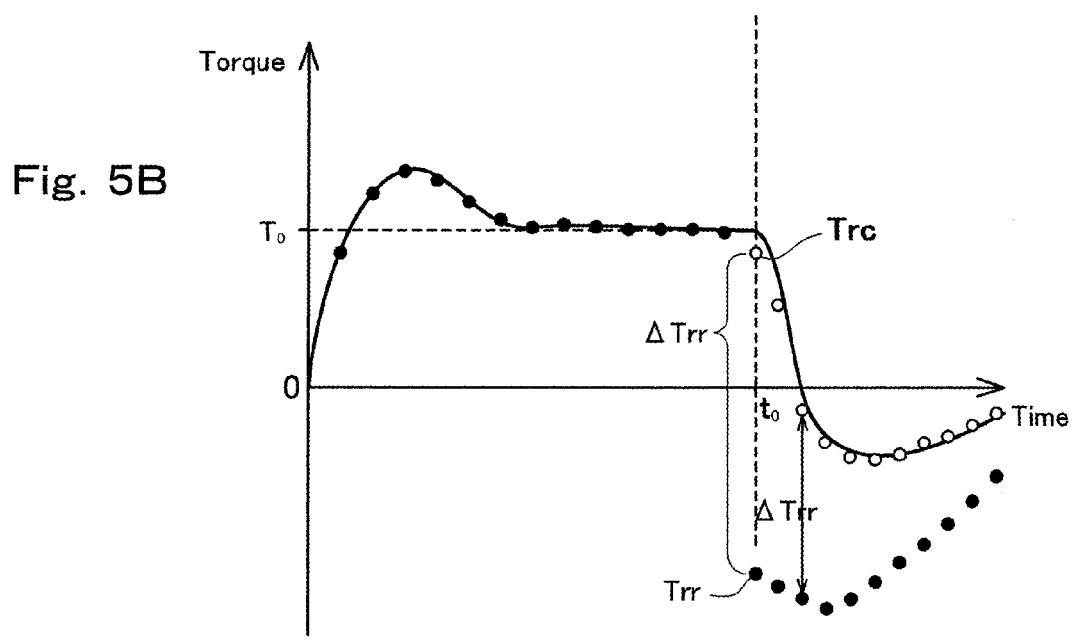
Figure 5C:
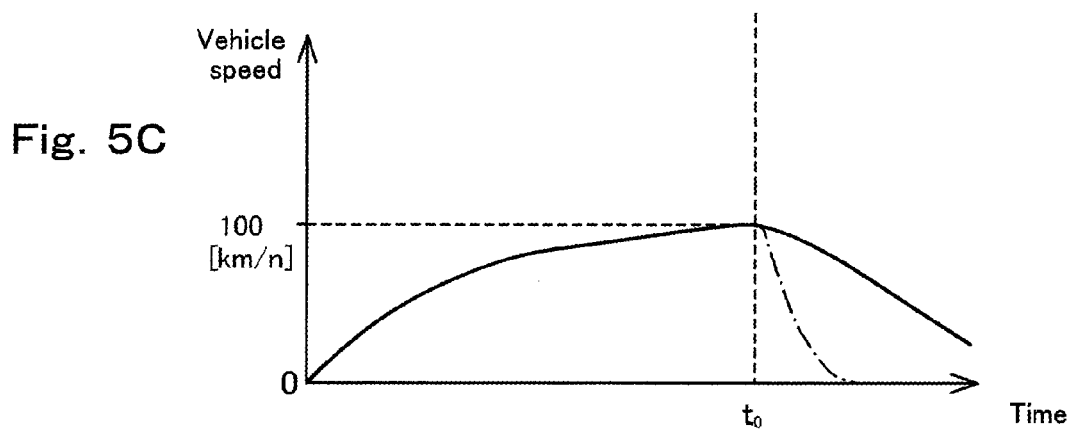

FIGS. 5A to 5C are graphs showing an example of a change in an accelerator operation amount, a change in torque, and a change in a vehicle speed, which occur with a passage of time, in the target torque calculating process. FIG. 5A indicates the accelerator operation amount. FIG. 5B indicates the torque generated in the electric motor 5 in a case where the accelerator operation with the operation amount of FIG. 5A is performed, and FIG. 5C indicates the vehicle speed which occurs in a case where the accelerator operation with the operation amount of FIG. 5A is performed. In each of the graphs, a horizontal axis indicates time, while a vertical axis indicates the operation amount, the torque, or the vehicle speed. In FIG. 5B, a solid line indicates the torque actually generated, black circles indicate the target torque, and white circles indicate torque commands after the asymptotic control is performed.

In the present embodiment, it is assumed that the electric motorcycle 1 has started and is driving on a road in an accelerative manner and/or at a constant speed, in a state in which the electric motor 5 is in the power running state. The processing performed by the control unit 22 sequentially occurs in predetermined calculating process cycles.

Initially, the determiner section 23 of the control unit 22 determines whether or not the vehicle state of the electric motorcycle 1 being driving on the road satisfies the regeneration condition, at arbitrary time in a range until acceleration termination time $t_0$ at which the accelerator operation amount is zero, after the electric motorcycle 1 has started (step S1). The regeneration condition is defined as the condition relating to any of the vehicle states, which is used to determine whether or not to shift the electric motor 5 to the regenerative running. In the present embodiment, the regeneration condition is such that the accelerator operation amount is 0% and a driving speed is equal to or higher than 2 km/h. The determiner section 23 determines whether or not the regeneration condition is satisfied based on the detected value received from the accelerator grip sensor 40 and the detected value received from the vehicle speed sensor 47. The phrase "the accelerator operation amount is 0%" is defined as a state in which the accelerator grip 30 is not operated by the rider, i.e., the accelerator grip 30 is returned from the reference position to an operation amount which is within a specified range (e.g., the angular displacement amount θ of the grip is equal to or larger than 0 degree and equal to or smaller than 1 degree).

When the determiner section 23 of the control unit 22 determines that the regeneration condition is satisfied, at the acceleration termination time $t_0$, the calculation section 24 of the control unit 22 sets target regenerative torque $T_{rr}$ according to the vehicle state to cause the electric motor 5 to generate the regenerative torque (step S2). In the present embodiment, the target regenerative torque is set based on the detected value of the motor rotational speed and the detected value of the accelerator operation amount. The calculation section 24 sets the target regenerative torque $T_{rr}$, based on the detected value received from the accelerator grip sensor 40 and the detected value received from the motor rotational speed sensor 46.

In the present embodiment, the target regenerative torque $T_{rr}$ is expressed as a product of a proportional coefficient K and reference regenerative torque $T_{rpm}$. The reference regenerative torque $T_{rpm}$ is set such that the reference regenerative torque decreases as the motor rotational speed approaches zero, when a motor rotational speed range is equal to or less than a first value X1 (see FIG. 6) and decreases as the motor rotational speed increases when the motor rotational speed range is equal to or larger than a second value X2 (see FIG. 6), which is larger than the first value X1. The proportional coefficient K is set such that it increases as an accelerator opening degree increases with time until the accelerator operation amount reaches zero. Therefore, as shown in FIG. 5B, at the acceleration termination time $t_0$, the proportional coefficient K increases, and hence the target regenerative torque $T_{rr}$ increases, as the change in the accelerator opening degree which occurs with time increases.

The change in the accelerator operation amount which occurs with time may be a change in the accelerator operation amount which occurs with time, before the regeneration condition is satisfied. Or, in a case where the regeneration condition is satisfied even when the accelerator operation amount is equal to or larger than zero, the change in the accelerator operation amount which occurs with time may be a change in the accelerator operation amount which occurs with time after the regeneration condition is satisfied. Further, the determiner section 23 of the control unit 22 determines whether or not an asymptotic control condition is satisfied (step S3). The asymptotic control condition is defined as conditions relating to the vehicle states which are used to determine whether or not to perform the asymptotic control for the torque command to mitigate an impact generated when the power running is terminated. In the present embodiment, the asymptotic control condition is such that a difference between the output torque of the electric motor 5 and the target regenerative torque $T_{rr}$ is larger than a predetermined value. Note that the output torque of the electric motor 5, which is just after the regeneration condition has been satisfied, is a positive torque.

When the determiner section 23 of the control unit 22 determines that the asymptotic control condition is satisfied, the calculation section 24 calculates an asymptotic control amount $\Delta T_{rr}$ (step S4). In the present embodiment, the calculation section 24 calculates the asymptotic control amount $\Delta T_{rr}$ based on the difference between the output torque of the electric motor 5 and the target regenerative torque $T_{rr}$ so that the torque command gradually approaches the target regenerative torque $T_{rr}$ with a passage of time after the regeneration condition has been satisfied. As shown in FIG. 5B, the target regenerative torque $T_{rr}$ is a negative value, while the asymptotic control amount $\Delta T_{rr}$ is set to a value for allowing the target torque which is just after the regeneration condition has been satisfied to become a positive torque value, which is smaller than the positive value of the output torque of the electric motor 5, which is just before the regeneration condition is satisfied.

In the present embodiment, then, the control unit 22 compensates the target regenerative torque $T_{rr}$, in response to the input operation of the adjustment lever 32 (step S5). Specifically, the determiner section 23 of the control unit 22 determines whether or not the regeneration adjustment lever 32 has been operated to input a command. The determiner section 23 determines whether or not the regeneration adjustment lever 32 has been operated to input a command, based on the detected value of the regeneration amount sensor 42. When the determiner section 23 determines that the regeneration adjustment lever 32 has been operated to input a command, the calculation section 24 of the control unit 22 calculates the compensation amount of the target regenerative torque $T_{rr}$, based on the operation amount of the regeneration adjustment lever 32, i.e., the adjustment command of the regenerative torque which is detected by the regeneration amount sensor 42.

Figure 6:
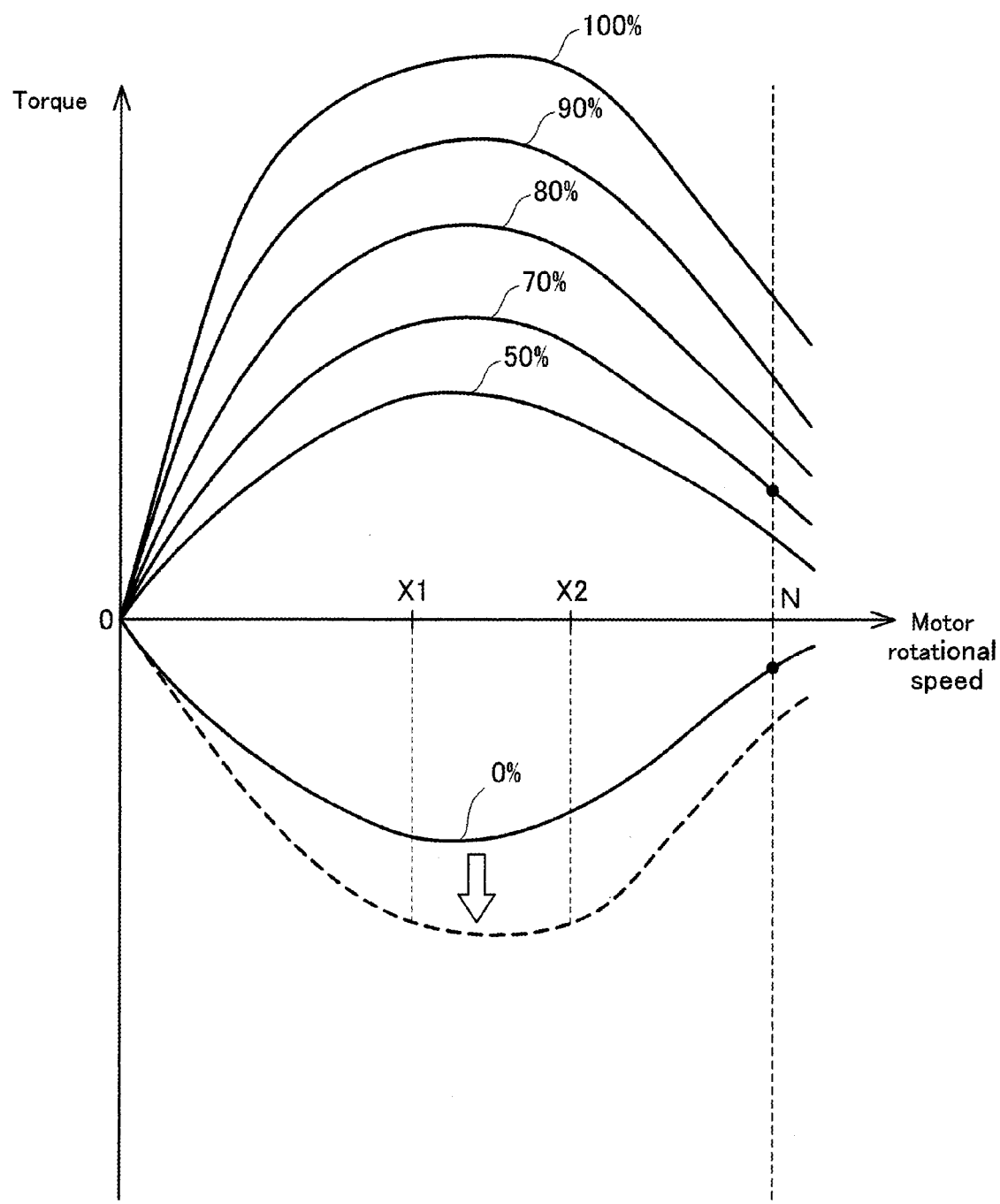
FIG. 6 is a graph schematically showing the characteristic of output torque of an electric motor in the regenerative brake control system of FIG. 2.

FIG. 6 is a graph schematically showing the characteristic of the output torque generated in the electric motor 5 in the regenerative brake control system 100. In FIG. 6, a horizontal axis indicates the motor rotational speed, while a vertical axis indicates the motor output torque. Curves in the positive value range of the output torque indicate the characteristics of the output torque of the electric motor 5 during the power running, such that these curves correspond to the accelerator operation amounts, respectively. These curves indicate the torque characteristics corresponding to the accelerator operation amounts of 100%, 90%, 80%, 70% and 50%, respectively, from the top. As can be seen from these graphs, the driving torque generated in the electric motor 5 during the power running increases, as the accelerator operation amount increases.

By comparison, a curve in the negative value range of the output torque indicates the characteristic of the output torque of the electric motor 5 during the regenerative running (accelerator operation amount is 0%).

The curves indicated by broken lines indicate a difference in the output torque characteristic which occurs due to a difference in the operation amount of the regeneration adjustment lever 32 during the regenerative running. In the present embodiment, the adjustment command of the regenerative torque is set such that the regenerative torque increases as the displacement amount of the regeneration adjustment lever 32 increases. Therefore, the regenerative torque increases with an increase in the operation amount of the regeneration adjustment lever 32.

Therefore, in accordance with the present embodiment, during the deceleration of the electric motorcycle 1, the rider can positively adjust the regenerative braking amount by using the regeneration adjustment lever 32, according to the driving state of the electric motorcycle 1. Thereby, even when the electric motorcycle 1 starts to turn due to a rapid speed decrease in the middle of high-speed driving, the rider can finely adjust the regenerative braking according to the rider's intention to adjust the posture of the vehicle body. In this way, the rider can easily move the vehicle body while stabilizing its posture. Finally, the calculation section 24 of the control unit 22 calculates the torque command $T_{rc}$ after the asymptotic control, by adding the asymptotic control amount $\Delta T_{rr}$ to the value of the target regenerative torque $T_{rr}$ (step S6). Thus, in a case where the determiner section 23 of the control unit 22 determines that the regeneration adjustment lever 32 has been operated to input a command in step S5, the compensation amount of the target regenerative torque $T_{rr}$ is included in the torque command $T_{rc}$. Then, the calculation section 24 provides the calculated torque command $T_{rc}$ to the motor control section 25.

As shown in FIG. 5B, after the acceleration termination time $t_0$, the asymptotic control is performed in response to the control command $T_{rc}$ received from the motor control section 25 in such a manner that the torque generated in the electric motor 5 gradually approaches the target regenerative torque $T_{rr}$ with a passage of time. This can avoid a rapid change in the torque of the electric motor 5 when the regeneration condition is satisfied. As a result, an impact generated by terminating the power running can be mitigated.

In the graph of FIG. 5C, a solid line indicates the vehicle speed of the electric motorcycle 1 after the acceleration termination time $t_0$, which results from the asymptotic control, while a one-dotted line indicates as a comparative example the vehicle speed of the electric motorcycle 1 after the acceleration termination time $t_0$, in a case where the asymptotic control is not performed. As can be seen from this graph, the vehicle speed can be more gradually decreased in a case where the asymptotic control is performed than in a case where the asymptotic control is not performed. When the determiner section 23 determines that the asymptotic control condition is not satisfied in step S3, the calculation section 24 immediately sets the target regenerative torque $T_{rr}$ as the torque command $T_{rc}$. In the present embodiment, the calculation section 24 provides to the motor control section 25 the target regenerative torque $T_{rr}$ as the torque command $T_{rc}$, when the difference between the output torque of the electric motor 5 and the target torque is smaller than a predetermined value. In response to this, the motor control section 25 provides to the electric motor 5 the control command corresponding to the torque command $T_{rc}$.

When the determiner section 23 of the control unit 22 determines that the regeneration condition is not satisfied, in step S1, the power running of the electric motor 5 is continued. In this case, to allow the electric motor 5 to continue to generate the driving torque, the calculation section 24 sets the driving torque $T_{rd}$ according to the vehicle state (step S7). In the present embodiment, the driving torque is set to a positive value based on the detected value of the motor rotational speed and the detected value of the accelerator operation amount. The calculation section 24 sets the reference driving torque which is the reference target torque based on the inputs, which are the detected value received from the accelerator grip sensor 40 and the detected value received from the motor rotational speed sensor 46. In this case, the calculation section 24 provides to the motor control section 25 the torque command $T_{rc}$ corresponding to the driving torque $T_{rd}$. As a result, the electric motorcycle 1 continues to drive in an accelerative manner or at a constant speed.

In general, the electric motor has a characteristic in which some time passes from when a command is provided to the electric motor until the electric motor actually outputs the output torque corresponding to the command. This means that the electric motor always responds to the command with a delay (i.e., has a response delay (lag)). This would be caused by, for example, motor inertia or an electric delay due to "inductance" of the coil. In a case where a primary cause of the delay is the electric delay due to "inductance" of the coil, even when a current is flowed to rotate the electric motor, an increase in the current is impeded due to the inductance. Therefore, some time passes until a current which is sufficient to rotate the electric motor flows, and as a result, the desired torque is generated. Thus, the electric motor has a delayed response with respect to the command, which is attributed to the characteristic of the electric motor. In this case, the output torque converges at the target torque before long, unless the target torque is changed. By comparison, the asymptotic control of the present embodiment is different from the control associated with the response delay in that the target torque is modified (compensated). As described above, by modifying the target torque so that the torque gradually approaches the reference torque, the impact which would be caused by regenerative braking can be mitigated.

Although in the present embodiment, the regenerative torque is adjusted only by using the regeneration adjustment lever 32, the regeneration amount of the regenerative torque may be changed by selecting the regenerative mode by the regenerative mode switch 33. Although in the present embodiment, the reference regenerative torque is set based on the detected value of the motor rotational speed and the detected value of the accelerator operation amount, the present invention is not limited to this. For example, the reference regenerative torque may be set based not only on the motor rotational speed and the accelerator operation amount, but also on a vehicle state other than the state of the regeneration operation amount, such as a change (transmission) gear ratio. Although in the present embodiment, the regeneration condition is such that the accelerator operation amount is 0% and the driving speed is equal to or higher than 2 km/h, the present invention is not limited to this. For example, the regeneration condition may be such that the accelerator operation amount is less than a predetermined value which is other than 0%. Further, as the regeneration condition, the driving speed is not limited to the value which is equal to or higher than 2 km/h, and may be equal to or higher than a predetermined speed which is other than 2 km/h. The regeneration condition may be such that the motor rotational speed is equal to a predetermined speed, instead of the driving speed.

In the regeneration condition, it is sufficient that at least the accelerator operation amount is equal to or less than a predetermined value. The regenerative running may be initiated even when a change in the accelerator operation amount, which occurs with time and is just before the regeneration condition is satisfied, is a value which is other than the negative value. The regeneration control may not be performed when the vehicle speed is equal to or lower than a predetermined speed. This can prevent the braking amount from being increased to excess. Further, the regeneration control may not be performed, when the clutch has been operated. This can provide a driving experience which is similar to that provided by a motor including an internal combustion engine. The regeneration initiation condition is merely exemplary, and can be set as desired based on the detected values of the sensors or vehicle conditions.

In the present embodiment, a case where the operation amount of the accelerator grip is zero has been exemplarily described. In a case where the regeneration adjustment lever is operated in a state in which the accelerator grip has been operated, the torque command may be set smaller with respect to the reference driving torque generated by the operation of the accelerator grip. Further, the torque command may be set such that the output torque decreases as the operation amount of the regeneration adjustment lever increases. In other words, the regeneration adjustment lever may serve as an operation member operated to provide a speed decrease command. Since the two operation members, which are the accelerator grip and the regeneration adjustment lever, provide the torque command, the torque command can be finely adjusted.

Further, mode shifting may be permitted over the entire speed range during driving, in response to a change command of the regenerative mode that is inputted by the shifting button, thereby allowing a quick adjustment of the regeneration. In this case, the regeneration amount may be gradually changed with a passage of time, when the mode is shifted. This can prevent a rapid change in the regeneration amount. Further, mode shifting may be permitted in response to a change command of the regenerative mode in non-regenerative braking. This can also prevent a rapid change in the regeneration amount. Since the setting means, which can be adjusted by the rider, is provided separately from the setting means of the reference regeneration amount, the reference regenerative torque can be easily set in accordance with the present embodiment.

Although in the present embodiment, the regeneration adjustment lever and the regenerative mode switch are provided to adjust the regenerative torque, a case where no adjustment lever is provided and only the switch is provided is included in the present invention. The configuration of the present embodiment is merely exemplary as the configuration of the operation member for adjusting the regenerative torque. Other embodiments may be used so long as the operation amount of the rider's operation of the operation member is detectable.

The electric motor 5 is not particularly limited so long as the instantaneous torque of the electric motor 5 can be controlled by using the power converter. For example, the electric motor 5 may be a DC motor.

Although in the present embodiment, asymptotic control is performed when the difference between the output torque of the electric motor and the target regenerative torque is larger than the predetermined value, the present invention is not limited to this. For example, asymptotic control may be performed when the driving speed or the motor rotational speed is equal to or higher than a specified speed which is higher than a regeneration initiation speed, while the target torque may be immediately provided to the electric motor when the driving speed or the motor rotational speed is lower than the specified speed. Further, asymptotic control may be performed when a change in the accelerator operation amount, which occurs with time, is equal to or larger than a predetermined value, while the target torque may be immediately provided to the electric motor when the change in the accelerator operation amount is less than the predetermined value.

Although in the present embodiment, asymptotic control is initiated after the regeneration condition is satisfied, the command indicating zero torque may be provided to the electric motor at a time point when the regeneration condition is satisfied, and asymptotic control may be performed such that the regeneration amount is gradually increased from the time point when the command indicating zero torque is provided. Further, the asymptotic control may be performed until the command indicating zero torque is reached, after the regeneration condition is satisfied.

Further, asymptotic control may be terminated and the regeneration amount demanded by the rider may be provided by operating the regeneration adjustment lever. The regeneration amount which is larger than the target regeneration amount may be provided by operating the regeneration adjustment lever. Further, the regenerative torque may be made gradually closer to zero when the motor rotational speed becomes a predetermined value or less, in the middle of the asymptotic control.

Further, it may be determined whether or not a large regeneration impact would be generated based on the output torque, the vehicle speed or the motor rotational speed, just after the regeneration condition is satisfied. Then, the asymptotic control may be performed when a large regeneration impact would be generated if the output torque is controlled based on the target regenerative torque, while the asymptotic control may not be performed when a large regeneration impact would not be generated even if the output torque is controlled based on the target regenerative torque. This can prevent the regeneration amount from becoming undesirably insufficient. For example, when it is determined that the electric motorcycle 1 is turning, regenerative braking may not be initiated until the turn has been finished, even after the regeneration condition is satisfied. Further, if the vehicle speed or the motor rotational speed is equal to or lower than a predetermined value, even when the difference between the output torque and the target torque is equal to or larger than the predetermined value, the regenerative control may be performed without performing asymptotic control. By preventing a rapid speed decrease of the vehicle, spinning of the wheel can be suppressed.

Although in the present embodiment, the asymptotic control amount $\Delta T_{rr}$ is calculated based on the output torque of the electric motor, the present invention is not limited to this. For example, the asymptotic control amount may be set based on the change gear ratio detected by a gear position sensor 48 of FIG. 2. In this case, the degree to which the regeneration impact is mitigated can be varied based on the change gear ratio. For example, when the change gear ratio is low, the regeneration impact is affected more, and therefore the asymptotic control amount may be set to a large value. On the other hand, when the change gear ratio is high, the asymptotic control amount may be set to a small value so that the output torque reaches the target torque sooner.

The asymptotic control amount may be set based on at least one of the driving speed, the motor rotational speed, and the change gear ratio. In such a case, the output torque may reach the target torque sooner, when the driving speed is low, the motor rotational speed is low, and the reduction gear ratio is high.

Further, a slip amount between the wheel and the road surface may be detected at the wheel side, it may be determined whether or not to perform the asymptotic control based on a detected slip amount, and the asymptotic control amount may be set.

The asymptotic control amount may be changed with a constant changing magnitude defined with a passage of time. Further, when the vehicle speed/motor rotational speed is high, at the start of the asymptotic control, the changing magnitude may be set smaller. On the other hand, when the vehicle speed/motor rotational speed is low, after a predetermined condition is satisfied, after the start of the asymptotic control, the changing magnitude may be set larger. Further, the asymptotic control amount may be asymptotically changed along a linear function with respect to a change in time, or along a multi-order function. In this way, the changing magnitude may be changed according to a change in the torque or with a passage of time. When a change in the accelerator operation amount, which occurs with time, is larger than a predetermined value, the rider's demand for deceleration is high, and the changing magnitude of the asymptotic control amount may be set larger, or otherwise the asymptotic control may not be performed. Further, when a deceleration rate in the control, after the regeneration condition is satisfied, is equal to or larger than a predetermined value, the changing magnitude may be set smaller. Further, when it is determined that there is a slip after the regeneration condition is satisfied, the changing magnitude may be set smaller. Further, when it is determined that a slip is likely to occur based on the vehicle speed, or an engine state such as a gear ratio, the changing magnitude may be set smaller. Further, if a speed change has been performed in the middle of regenerative braking, the asymptotic control may be changed such that the regeneration impact would be reduced after the speed change, in view of a speed change operation.

In the present embodiment, as shown in FIG. 5B, after the acceleration termination time $t_0$, in the relation between the target regenerative torque $T_{rr}$ and the torque command $T_{rc}$, the target regenerative torque $T_{rr}$ decreases to a minimum value and then gradually increases, and the torque command $T_{rc}$ gradually decreases and approaches the target regenerative torque $T_{rr}$. Thus, asymptotic control is performed. However, this is exemplary. For example, in alternative examples, the target regenerative torque $T_{rr}$ may gradually decrease to a minimum value, then gradually increase, and converge at a constant value. In contrast, the torque command $T_{rc}$ may gradually decrease, increase to a maximum value with an increase in the asymptotic control amount $\Delta T_{rr}$, then decrease again and approach the target regenerative torque $T_{rr}$. Further, the target regenerative torque $T_{rr}$ may be a constant value over a passage of time, while the torque command $T_{rc}$ may gradually approach the target regenerative torque $T_{rr}$ while increasing the changing magnitude of the asymptotic control amount $\Delta T_{rr}$. Further, the target regenerative torque $T_{rr}$ may be changeable according to a speed irrespective of a change in the accelerator operation amount, while the torque command $T_{rc}$ may gradually approach the target regenerative torque $T_{rr}$ while keeping the changing magnitude of the asymptotic control amount $\Delta T_{rr}$ constant.

The electric vehicle has a smaller rotation inertia of a motor or a driving power transmission system. Therefore, the electric vehicle responds promptly to the command value, and the drive wheel rotates at a decreased speed. Since the vehicle body is lightweight, its speed is decreased relatively quickly according to the speed-decreased rotation of the drive wheel. Therefore, by gradually changing the command value, the impact can be reduced.

In accordance with the present embodiment, since the asymptotic control is performed, the regenerative energy can be efficiently utilized while mitigating the impact, even when the target regenerative torque is set to a large value. Further, the regeneration adjustment lever may be operated to cancel the asymptotic control to rapidly increase the regeneration amount according to the rider's demand.

Although in the present embodiment, the regenerative brake control system including the regeneration adjustment lever has been described, it may not include the regeneration adjustment lever and the regenerative mode switch. In this case as well, the asymptotic control can provide the same advantages as those of the present embodiment.

For example, the reference regenerative torque may be set such that the regeneration amount increases as the motor rotational speed is closer to a specified value, and decreases as the motor rotational speed moves away from the specified value. Further, the reference regenerative torque may be set such that the specified value is smaller than a maximum motor rotational speed, and thus the regeneration amount is smaller when the motor rotational speed is extremely low or extremely high.

Further, for example, the regeneration amount may be changed based on the reduction gear ratio of the transmission in such a manner that the regeneration amount is larger when the reduction gear ratio is higher than when the reduction gear ratio is lower. Further, the regeneration amount may be changed with a passage time in such a manner that the regeneration amount is increased from when the regeneration has been started until a specified time has passed, and is decreased when the specified time has passed.

The reference regenerative torque may be set such that the regeneration amount is decreased with a decrease in the vehicle speed or the motor rotational speed. In this case, at a time point when the vehicle speed or the motor rotational speed reaches a value which is less than a predetermined value, the regenerative control may be terminated. This makes it possible to prevent a situation in which the vehicle speed becomes very slow and driving becomes unstable, or the vehicle body drives backward undesirably, due to regenerative braking.

In a case where the absolute value of a change in the accelerator operation amount, which occurs with time until the accelerator operation amount reaches a predetermined value or less, is large, specifically in a case where the accelerator grip is rotated relatively quickly, the regeneration amount may be set larger than in a case where the accelerator grip is rotated relatively slowly.

The reference regenerative torque is preferably set so that a slip in the middle of regenerative braking is prevented. The regeneration amount may be decreased when a monitored value of the slip exceeds a set value. For example, the monitored value may be a rotational speed difference between the front and rear wheels, or a value obtained by dividing the rotational speed difference by the vehicle speed.

Or, the monitored value may be compensated based on a gear ratio and a vehicle speed. For example, preferably, the rider may select whether or not to apply slip prevention. In a case where the slip prevention setting is selected, regenerative braking may be allowed to occur within a range in which the monitored value associated with the slip does not exceed a set value, when the regeneration amount is increased by using the adjustment lever. This can more effectively suppress slips caused by regenerative braking.

Conversely, regenerative braking may occur such that the monitored value associated with the slip exceeds the set value, when the regeneration amount is increased by using the adjustment lever. This allows the rider to command the regeneration amount to be increased even when the monitored value is set to a relatively small value, which improves convenience.

The reference regenerative torque may be set based on the detected value of a bank angle sensor, such that the reference regenerative torque decreases as the bank angle of the vehicle body increases. This makes it possible to prevent a situation in which the vehicle speed decreases rapidly and the vehicle body becomes unstable before or during a turn. Even in a case where the reference regenerative torque associated with the turn is small as described above, regenerative braking can be used to adjust the posture of the vehicle body before and during a turn, by compensating for increasing the regenerative torque by the rider's operation of the regeneration adjustment lever. This allows the rider to make use of regenerative braking to adjust the posture of the vehicle body at the start of a turn according to the rider's technique. In this case, the regenerative torque is preferably compensated by using the regeneration adjustment lever such that the effect of the bank angle is made less than the reference regenerative torque.

The reference regenerative torque may be set so as to gradually reach the target value with a passage of time. This can prevent rapid deceleration at the start of regenerative braking. Thus, even when the regeneration amount at the time of generation of the regenerative torque is small, the rider can realize rapid deceleration at the start of regenerative braking, by making compensation for increasing the regenerative torque by using the regeneration adjustment lever. This allows the rider to make use of regenerative braking to adjust the speed before the turn according to the rider's technique. In this case, the regenerative torque is preferably compensated by using the regeneration adjustment lever in such a manner that the regenerative torque reaches a target value in a shorter time than the reference regenerative torque.

In a case of a motorcycle, in which the front wheel is mounted to the front fork and the rear wheel is mounted to the swing arm, like the electric motorcycle 1 of the present embodiment, a pitching occurs, in which the vehicle body is angularly displaced around the axis extending in a vehicle width direction, by the front wheel mechanical braking, and a force for causing the rear portion of the seat to be raised up is generated. Unlike front wheel braking, in regenerative braking, a force for causing the rear portion of the seat to be moved down is generated. In this way, rear wheel regenerative braking makes it possible to effectively control the posture of the vehicle body around the time when the electric motorcycle 1 is about to drive into a corner, as compared to front wheel mechanical braking.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention allows an electric vehicle to be smoothly driven, while performing regenerative braking.

REFERENCE CHARACTER LIST

1 . . . electric motorcycle
5 . . . electric motor
22 . . . control unit (ECU)
23 . . . determiner section
24 . . . calculation section
25 . . . motor control section
26 . . . storage section
32 . . . regeneration adjustment lever
33 . . . regenerative mode switch
40 . . . accelerator operation amount sensor
42 . . . regeneration operation amount sensor
43 . . . regenerative mode sensor
60 . . . display unit
100 . . . regenerative brake control system

The invention claimed is:

1. A regenerative brake control system comprising:
an electric motor;
a detecting device for detecting a vehicle state; and
a control unit configured to set a regenerative torque of the electric motor;
wherein the control unit is configured to set a target regenerative torque based on the vehicle state detected by the detecting device when a predetermined regeneration condition is satisfied,
wherein when a predetermined asymptotic control condition is satisfied, the control unit is configured to perform an asymptotic control process in which a regenerative torque command provided to the electric motor approaches the target regenerative torque over time, and
wherein when the predetermined asymptotic control condition is not satisfied, the control unit is configured to immediately provide the target regenerative torque as the regenerative torque command to the electric motor;
wherein the target regenerative torque is a negative torque value, and
wherein the control unit is configured to:
calculate an asymptotic control amount in the asymptotic control process, the asymptotic control amount being a positive torque value that is smaller than an output torque of the electric motor just before the regeneration condition is met,
decrease the positive torque value of the asymptotic control amount over time, and
calculate the regenerative torque command by adding the asymptotic control amount to the target regenerative torque.

2. The regenerative brake control system according to claim 1,
wherein the predetermined asymptotic control condition is when a difference between a value of torque output from the electric motor and a value of the target regenerative torque is larger than a predetermined value, and
wherein the control unit is configured to provide a target regenerative torque command immediately when the difference between the value of the torque output from the electric motor and the value of the target regenerative torque is smaller than the predetermined value.

3. The regenerative brake control system according to claim 1, wherein the predetermined asymptotic control condition is when a driving speed or a motor rotational speed is equal to or higher than a specified speed which is higher than a predetermined regeneration initiation speed, and
wherein the control unit is configured to provide a target regenerative torque command immediately when the driving speed or the motor rotational speed is lower than the specified speed.

4. The regenerative brake control system according to claim 1,
wherein the predetermined asymptotic control condition is when a change in an operation amount of an acceleration operation member which occurs before the regeneration condition is satisfied is equal to or larger than a predetermined value, and
wherein the control unit is configured to provide a target regenerative torque command immediately when the change in the operation amount of the acceleration operation member which occurs before the regeneration condition is satisfied is smaller than the predetermined value.

5. The regenerative brake control system according to claim 1, being configured to transmit a driving power generated in the electric motor via a transmission, the regenerative brake control system further comprising:
a transmission detecting device for detecting a change gear ratio of the transmission,
wherein the control unit is configured to set the asymptotic control amount based on the change gear ratio in the asymptotic control process.

6. The regenerative brake control system according to claim 1,
wherein the vehicle is a two-wheeled vehicle.

7. The regenerative brake control system according to claim 1, being applied to a motorcycle in which a rear wheel is mounted to a swing arm.

8. The regenerative brake control system according to claim 1, further comprising:
a first regeneration operation member which is operated to adjust the regenerative torque of the electric motor,
wherein the control unit is configured to adjust the regenerative torque in response to an adjustment command of the regenerative torque, corresponding to an operation of the first regeneration operation member.

9. The regenerative brake control system according to claim 8, further comprising:
a second regeneration operation member which is operated to adjust the regenerative torque of the electric motor;
wherein the control unit is configured to change an adjustment amount of the regenerative torque, in response to a change command of a regenerative mode selected by an operation of the second regeneration member.

10. The regenerative brake control system according to claim 1,
wherein when the regeneration condition is satisfied, the control unit is configured to provide a command indicating zero torque to the electric motor and performs the asymptotic control process such that a regeneration amount is gradually increased from the command indicating zero torque.

11. The regenerative brake control system according to claim 1,
   wherein when a rotational speed of the electric motor is equal to or lower than a predetermined value in a middle of the asymptotic control process, the control unit is configured to make the regenerative torque approach zero.

12. The regenerative brake control system according to claim 1, being configured to transmit a driving power generated in the electric motor via a transmission, the regenerative brake control system further comprising:
   a transmission detecting device for detecting a change gear ratio of the transmission,
   wherein the control unit is configured to set the asymptotic control amount based on a driving speed of a vehicle, a rotational speed of the electric motor, and the change gear ratio in the asymptotic control process.

13. The regenerative brake control system according to claim 1,
   wherein a slip amount between a wheel and a road surface is detected at the wheel side, and the asymptotic control amount is set based on the detected slip amount in the asymptotic control process.

\* \* \* \* \*